United States Patent
Mochizuki et al.

(10) Patent No.: US 7,387,230 B2
(45) Date of Patent: Jun. 17, 2008

(54) BRAZING FILTER METAL SHEET AND METHOD FOR PRODUCTION THEREOF

(75) Inventors: Chitoshi Mochizuki, Yokohama (JP);
Takayuki Iwasaki, Yokohama (JP);
Hiroki Yoshizawa, Funabashi (JP)

(73) Assignee: Ishikawajima-Harima Heavy Industries Co., Ltd. (JP)

( * ) Notice: Subject to any disclaimer, the term of this patent is extended or adjusted under 35 U.S.C. 154(b) by 0 days.

(21) Appl. No.: 10/562,654

(22) PCT Filed: Dec. 26, 2003

(86) PCT No.: PCT/JP03/17023

§ 371 (c)(1),
(2), (4) Date: Dec. 27, 2005

(87) PCT Pub. No.: WO2005/002780

PCT Pub. Date: Jan. 13, 2005

(65) Prior Publication Data

US 2006/0163322 A1    Jul. 27, 2006

(30) Foreign Application Priority Data

Jul. 7, 2003    (JP) .............................. 2003-192901

(51) Int. Cl.
*B23K 35/14*    (2006.01)
*B22F 1/00*    (2006.01)

(52) U.S. Cl. .................. 228/56.3; 228/245; 228/248.1; 419/38; 419/43

(58) Field of Classification Search .................. None
See application file for complete search history.

(56) References Cited

U.S. PATENT DOCUMENTS

| | | | |
|---|---|---|---|
| 4,075,009 A | 2/1978 | Stern | 75/170 |
| 4,302,515 A * | 11/1981 | DeCristofaro et al. | 428/680 |
| 4,380,479 A | 4/1983 | Coad | 148/11.5 P |
| 4,448,618 A | 5/1984 | Bose et al. | 148/403 |
| 4,561,889 A * | 12/1985 | Oaku et al. | 75/243 |
| 4,587,097 A | 5/1986 | Rabinkin et al. | 420/473 |
| 4,913,752 A | 4/1990 | Falk | 148/336 |
| 4,923,100 A * | 5/1990 | Nakamura et al. | 228/117 |
| 5,377,899 A * | 1/1995 | Hashimoto | 228/117 |

(Continued)

FOREIGN PATENT DOCUMENTS

EP    0 867 248 A1 *    9/1998

(Continued)

OTHER PUBLICATIONS

International Search Report for PCT/JP03/17023 dated Apr. 13, 2004 (in English).

(Continued)

*Primary Examiner*—Kiley Stoner
(74) *Attorney, Agent, or Firm*—Ostrolenk, Faber, Gerb & Soffen, LLP

(57) ABSTRACT

In order to provide a brazing sheet having excellent workability, a powder of a brazing filler metal composition is obtained from a single type of powder or by mixing two or more powders to form the brazing filler metal composition. By powder roll compaction of the powder, the powder is formed into a sheet shape.

17 Claims, 8 Drawing Sheets

U.S. PATENT DOCUMENTS

| | | | |
|---|---|---|---|
| 5,547,517 A * | 8/1996 | Iwai | 148/24 |
| 5,837,388 A * | 11/1998 | Doko et al. | 428/654 |
| 6,344,237 B1 * | 2/2002 | Kilmer et al. | 427/190 |
| 6,997,371 B2 * | 2/2006 | Shabtay | 228/183 |
| 7,000,823 B2 * | 2/2006 | Dockus et al. | 228/262.51 |
| 7,041,385 B2 * | 5/2006 | Wittebrood | 428/650 |
| 2003/0085258 A1 * | 5/2003 | Ishio et al. | 228/115 |
| 2006/0027625 A1 * | 2/2006 | Dockus et al. | 228/56.3 |

FOREIGN PATENT DOCUMENTS

| | | |
|---|---|---|
| JP | 3-32488 | 2/1991 |
| JP | 06-218580 | 8/1994 |
| JP | 6-218580 | 8/1994 |
| JP | 06-232188 | 8/1994 |
| JP | 06218580 A * | 8/1994 |
| JP | 2002-305213 | 10/2002 |
| KR | 1998-080467 | 11/1998 |
| RU | 2011497 | 4/1994 |
| SU | 1562091 | 5/1990 |

OTHER PUBLICATIONS

Proceedings of the 54$^{th}$ Japanese Joint Conference for the Technology of Plasticity, published Oct. 20, 2003, pp. 271-272 (original Japanese and English translation).

Austrian Search Report dated Sep. 11, 2006.

Korean Office Action dated Nov. 30, 2006.

* cited by examiner

FIG. 5
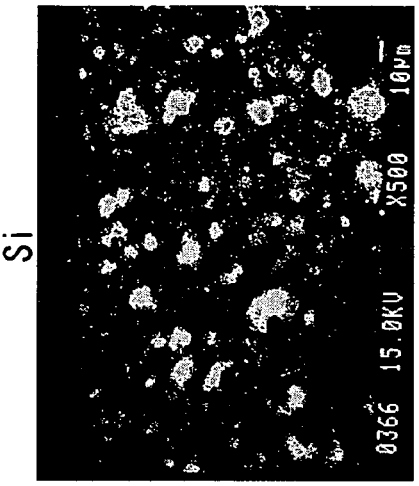
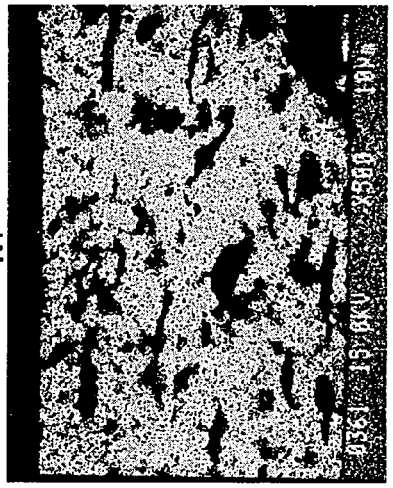
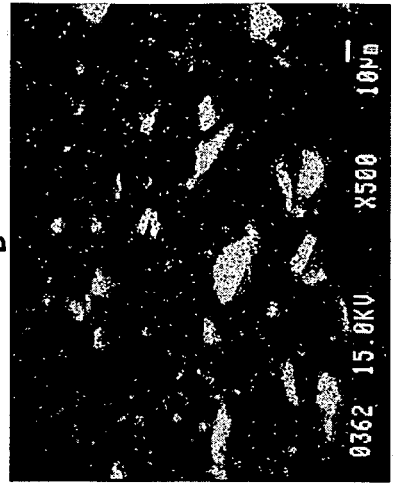
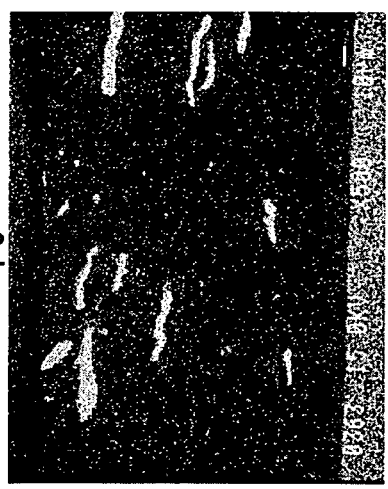

FIG. 7
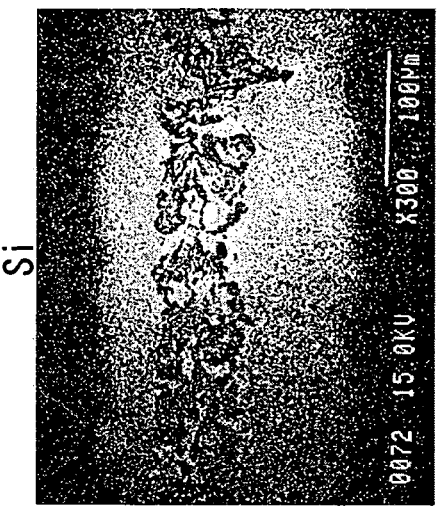
Si
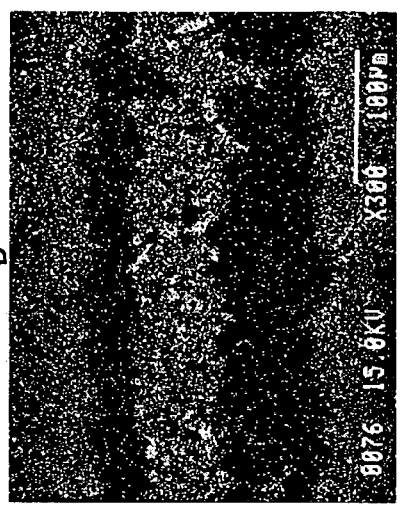
B
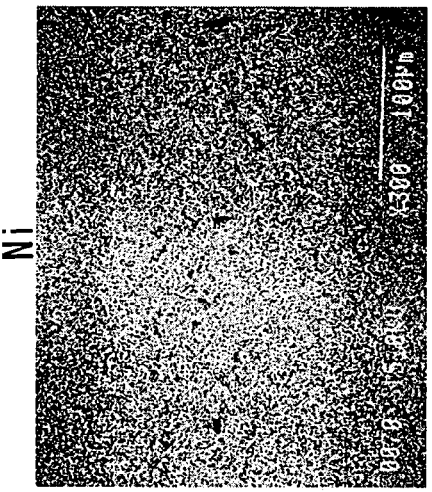
Ni
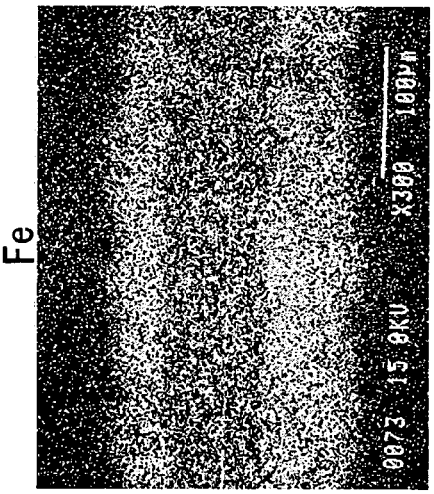
Fe
IMAGE
Cr

BRAZING FILTER METAL SHEET AND METHOD FOR PRODUCTION THEREOF

TECHNICAL FIELD

The invention relates to a brazing sheet which is a brazing filler metal formed as a sheet shape, and a production method thereof.

BACKGROUND ART

A nickel brazing sheet currently available is an amorphous sheet formed by quenching rolling of a molten metal having a composition of a nickel brazing filler metal. A spring-like elasticity of such an amorphous sheet makes it difficult to fit and fill the sheet in a predetermined space. In addition, since the sheet is an extremely thin foil (several tens of micrometers thick), good workability cannot be expected. In order to fill a large space, it is required to cut the foils in a predetermined shape, and lay the foils to form multi layers on a joint surface. Furthermore, a limitation on sheet width restricted by a nozzle diameter used in the quenching rolling method also inhibits the workability. In order to braze a joint having a large width, it is necessary to lay a plurality of the brazing sheets adjacent to each other.

In addition to the brazing sheets, a powder of a nickel brazing filler metal is also available. However, with such a powder, good workability during the brazing operation also cannot be expected, because it is required to mix a binder with a powder to form a paste, and a process for vaporization of the binder cannot be avoided before brazing. In addition, some carbonized binder remains after brazing and deteriorates the quality of the brazing joint.

DISCLOSURE OF INVENTION

The present invention is carried out in consideration of the above described problem, and aims to provide a brazing sheet having excellent workability and a production method for the brazing sheet.

In the present invention, in order to achieve the above described object by solving a problem of the brazing sheet, a brazing sheet is produced by forming a powder of brazing filler metal composition into a sheet shape.

In the present invention, as a solution for the problem on the production of a brazing sheet, a powder of a brazing filler metal composition is formed into a sheet shape by rolling the powder.

With the present invention, since a powder of a brazing filler metal composition is formed into a sheet shape, it is possible to set the sheet thickness over wide range of values by controlling the pressing force during the forming process. Therefore, compared to the conventional foil shape amorphous sheet, the brazing sheet of the present invention is extremely convenient and may greatly enhance the workability in braze jointing.

BRIEF DESCRIPTION OF THE DRAWINGS

FIG. 5 is a set of analytical images showing a cross section of a nickel brazing sheet A according to an embodiment of the invention.

FIG. 7 is a set of analytical images showing a cross section of a brazing joint using a nickel brazing sheet A according to an embodiment of the invention.

BEST MODE FOR CARRYING OUT THE INVENTION

In the following description, an embodiment of a brazing sheet and a production method thereof according to the invention are explained with reference to the drawings. This embodiment relates to a nickel brazing sheet using, as a powder raw material, a powder having a composition of a nickel brazing filler metal mainly composed of nickel (a powder of a nickel brazing filler metal composition).

Figure 1:
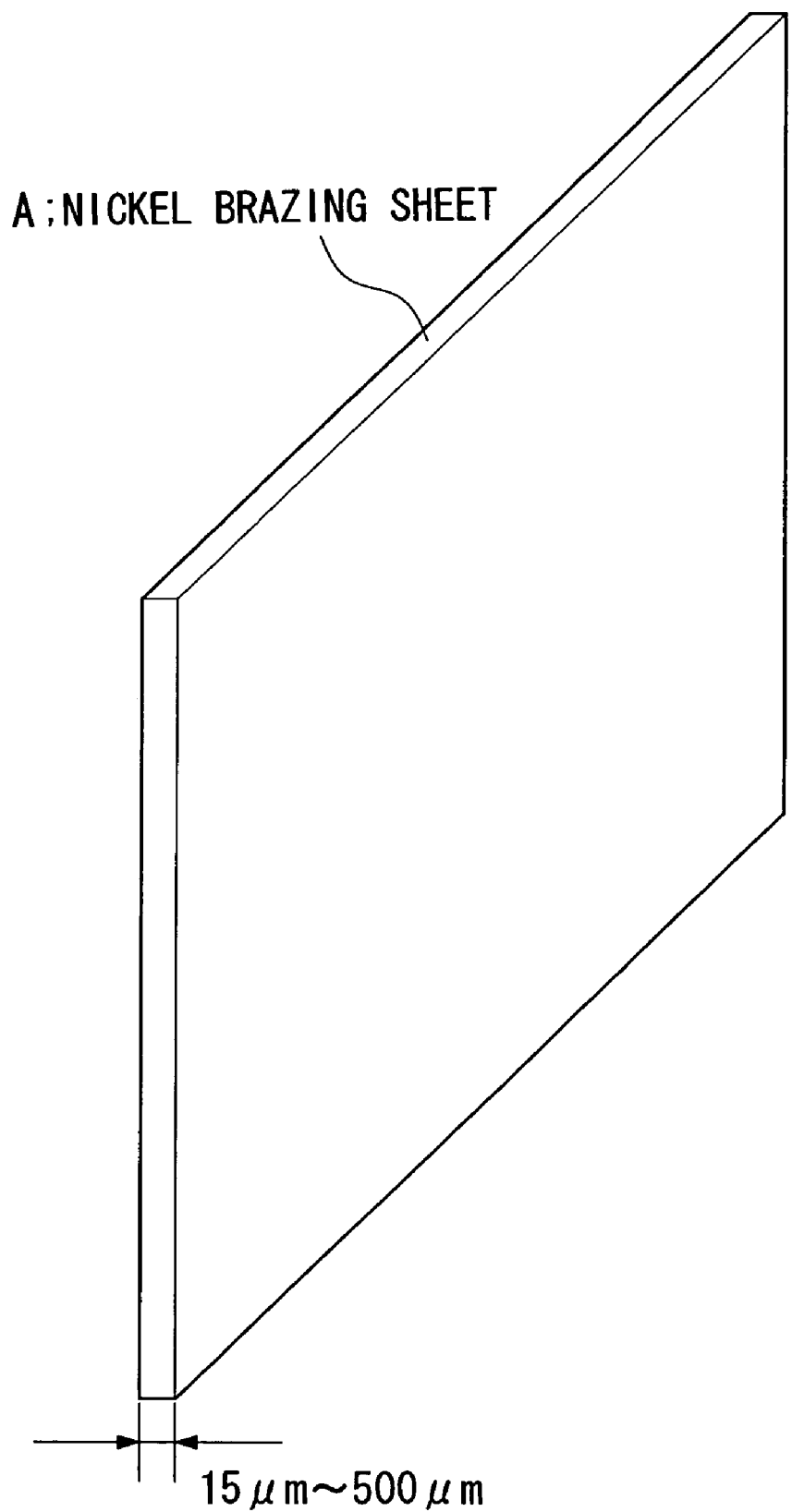
FIG. 1 is a strabismic view showing a constitution of a brazing sheet A according to an embodiment of the invention.
Figure 2:
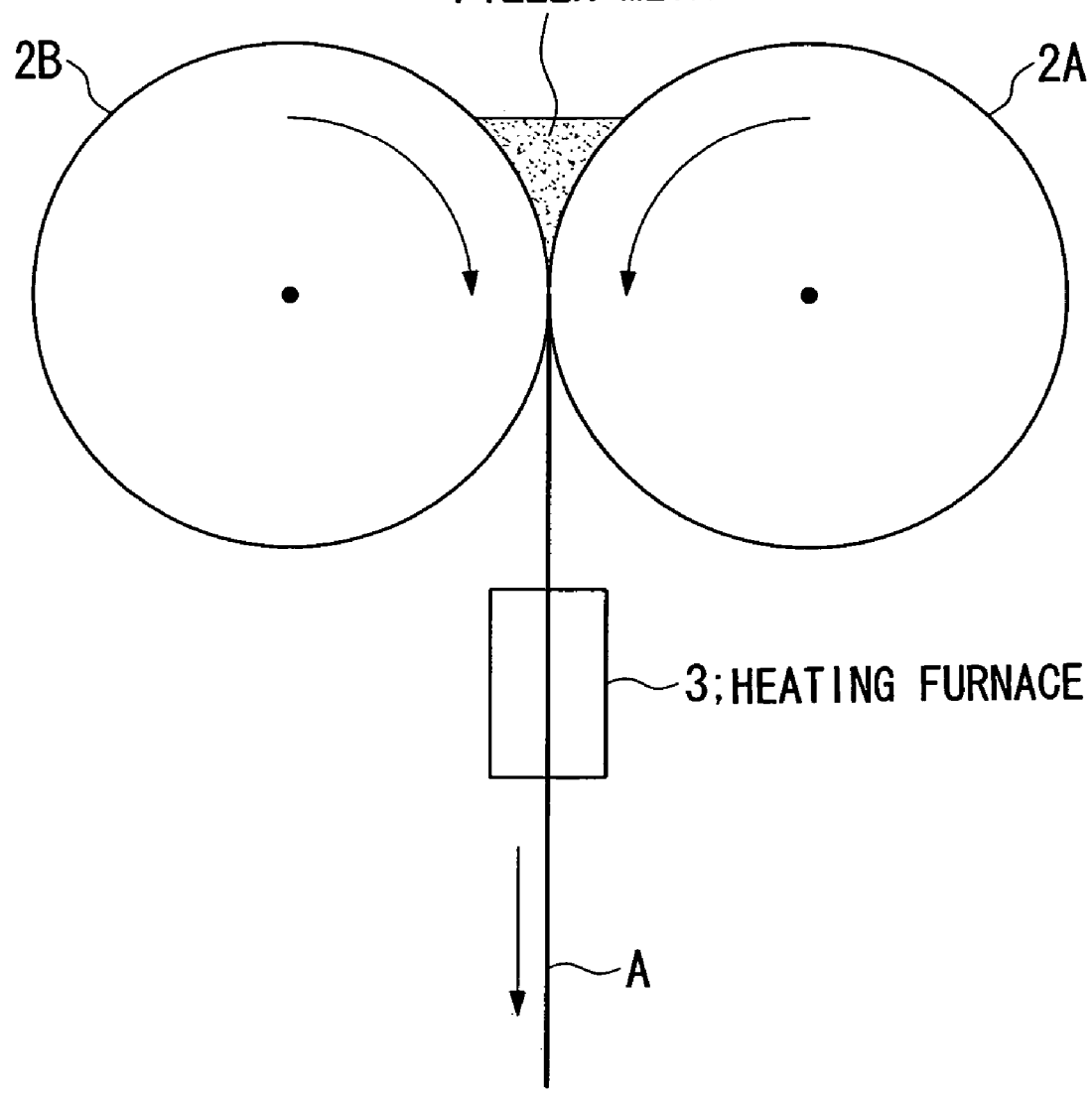
FIG. 2 is a schematic diagram showing a constitution of a device for producing brazing sheets according to the present invention.

FIG. 1 is a perspective view of a nickel brazing sheet of the embodiment. FIG. 2 is a schematic diagram of a device for producing the nickel brazing sheet (brazing sheet production device). In these drawings, symbol A denotes a nickel brazing sheet, 1 denotes a powder of a nickel brazing filler metal composition, 2A and 2B denote rolling rollers, and 3 denotes a heating furnace.

The brazing sheet A is produced by forming the powder 1 of the nickel brazing filler metal composition into a sheet shape by a plastic working method, or by a binder forming method, and sintering the sheet. The plastic working method is a method for forming the powder 1 of the nickel brazing filler metal composition into a sheet by pressing or by rolling or the like. An example used in this embodiment is a powder roll compaction. In the binder forming method, after milling the powder 1 of the nickel brazing filler metal composition and a binder resin, the mixture is formed into a sheet, for example, by a doctor blade method.

In the general plastic working, it is difficult to form a sheet member having a successive band shape. Such a problem may be overcome by the powder roll compaction. Compared to the binder forming, the powder roll compaction has an advantage in simplifying the production process by avoiding the step of milling a resin and the powder 1 of the nickel brazing filler metal composition.

A plate thickness of the nickel brazing sheet A is controlled within a range of ca. 15 μm (micrometers) to 500 μm (micrometers). The powder 1 of the brazing filler metal composition is a powder of a nickel-base alloy mainly composed of nickel and has a grain size of not greater than 100 micro meters. The grain size of the powder 1 of the nickel brazing filler metal composition is selected from a preferable size corresponding to the plate thickness after forming. That is, the grain size is selected from a preferable size easily formed into the sheet shape by powder roll compaction.

A brazing sheet production device for producing such a nickel brazing sheet A comprises, as shown in FIG. 2, the pair of rolling rollers 2A, 2B, and the heating furnace 3. The pair of rolling rollers 2A and 2B is arranged so that the peripheral surfaces of respective rollers are opposed to each other in a parallel arrangement with a predetermined space intervening. The heating furnace 3 is provided for a downstream step after rolling by the rolling rollers 2A, and 2B.

The powder 1 of the nickel brazing filler metal composition is fed to the pair of rolling rollers 2A, 2B from an upper side. The powder 1 of the nickel brazing filler metal composition is mainly composed of nickel (Ni) and contains, for example, predetermined percent by weight of chromium (Cr), iron (Fe), silicon (Si), and boron (B). For example, the powder may have a composition of a nickel brazing filler metal of JIS standard, such as BNi-1, BNi-2, BNi-3, BNI-4, BNi-5, BNi-6, or BNi-7.

By rotation driving of each of the rolling rollers 2A and 2B as shown by the arrows, the powder 1 of the nickel brazing filler metal composition is fed into the space formed between the rolling rollers 2A and 2B. The powder 1 of the nickel brazing filler metal composition 1 is pressed by powder roll compaction, that is by the rolling rollers 2A and 2B, sequentially delivered to a downward direction, and thereby formed into a sheet shape.

The sheet shaped compact powder 1 of the nickel brazing filler metal composition is sintered by heating to a predetermined temperature in the heating furnace 3 placed downstream under the rolling rollers 2A and 2B. A sintering temperature within the heating furnace 3 is a temperature corresponding to about 50 to 85% of the liquidus temperature of the powder 1 of the nickel brazing filler metal composition. Thus, the above described nickel brazing sheet A is delivered from the heating furnace 3. If a platy inferior portion is found after the sintering, the sheet may be subjected to the rolling for a second time. If a thin plate is desirable, the heating step and the rolling step may be repeated.

In this embodiment, the powder 1 of the nickel brazing filler metal composition is formed into a sheet shape by the powder roll compaction. As described above, the thickness of the sheet may be set over a wide range of values by controlling the pressing force during the powder roll compaction. Therefore, the produced nickel brazing sheet A is particularly convenient for use compared to a conventional foil shaped amorphous sheet. With this sheet, it is possible to highly enhance the workability of a brazing operation.

The present invention is not limited to the above described embodiment. For example, the following modification may be considered. Although in the above described embodiment, the sintering treatment in the heating furnace 3 is carried out after the powder roll compaction treatment by the rolling rollers 2A and 2B, this sintering is not necessarily an essential treatment. For example, the powder 1 of the nickel brazing filler metal composition may be formed into a sheet shape only by the powder roll compaction treatment by the rolling rollers 2A and 2B.

The powder 1 of the nickel brazing filler metal composition is not limited to a powder of a single base material, but may also be made of a mixture of a plurality of powder materials. As the powder 1 of the nickel brazing filler metal composition as a mixture of a plurality of powder materials, for example, the following material may be considered. In the following description an allowable range of fluctuation for each component is ±5%.

In this case, the sintering temperature by the heating furnace 3 is set to be relatively low temperature, for example, at about 50% of liquidus temperature of the powder 1 of the brazing filler metal composition. At this setting, the powder 1 of the nickel brazing filler metal composition is formed into a sheet shape to form the nickel brazing sheet A in which the powders that are not completely alloyed remain in a mixed state.

Flexibility of the nickel brazing sheet A decreases with an increasing degree of alloying of the powders of each base material. Therefore it is preferable to set the sintering temperature in the heating furnace 3 to a temperature corresponding to about 50% of the liquidus temperature of the powder 1 of the nickel brazing filler metal composition so that the powders of each base material remain in a mixed state not completely alloyed. When such a nickel brazing sheet A is actually used in the brazing joint, the sheet is molten and acts as a brazing filler metal.

(1) As an equivalent material to BNi-1 of JIS standard, a mixture of powdered nickel (Ni), powdered chromium (Cr), powdered silicon (Si), powdered iron (Fe), and powdered boron (B) may be considered. For example, the five types of powders are mixed in a proportion of 74 wt %:14 wt %:4.0 wt %:4.5 wt %:3.5 wt %, respectively.

(2) The mixed powder may be formed by mixing powdered nickel (Ni), powdered chromium (Cr), powdered boron (B), powdered iron (Fe), and powdered silicon (Si) in a predetermined proportion of weight to prepare a powder having a composition of BNi-2. A sheet formed by such a mixed powder is a sheet of a mixed material, containing not less than 80 wt % of powdered nickel (Ni) having ductility. In such a sheet, ductile nickel occupies a main portion and includes other constituent powders. Therefore, it is possible to obtain a sheet which is not brittle and has excellent ductility and handling properties.

As an equivalent material to BNi-2 of JIS standard, it is possible to consider a mixture of powdered nickel (Ni), powdered chromium (Cr), powdered silicon (Si), powdered iron (Fe) powder, and powdered boron (B). The five types of powders may be mixed, for example, in a proportion of 82.5 wt %:7 wt %:4.5 wt %:3.0 wt %:3.0 wt %, respectively.

Figure 3:
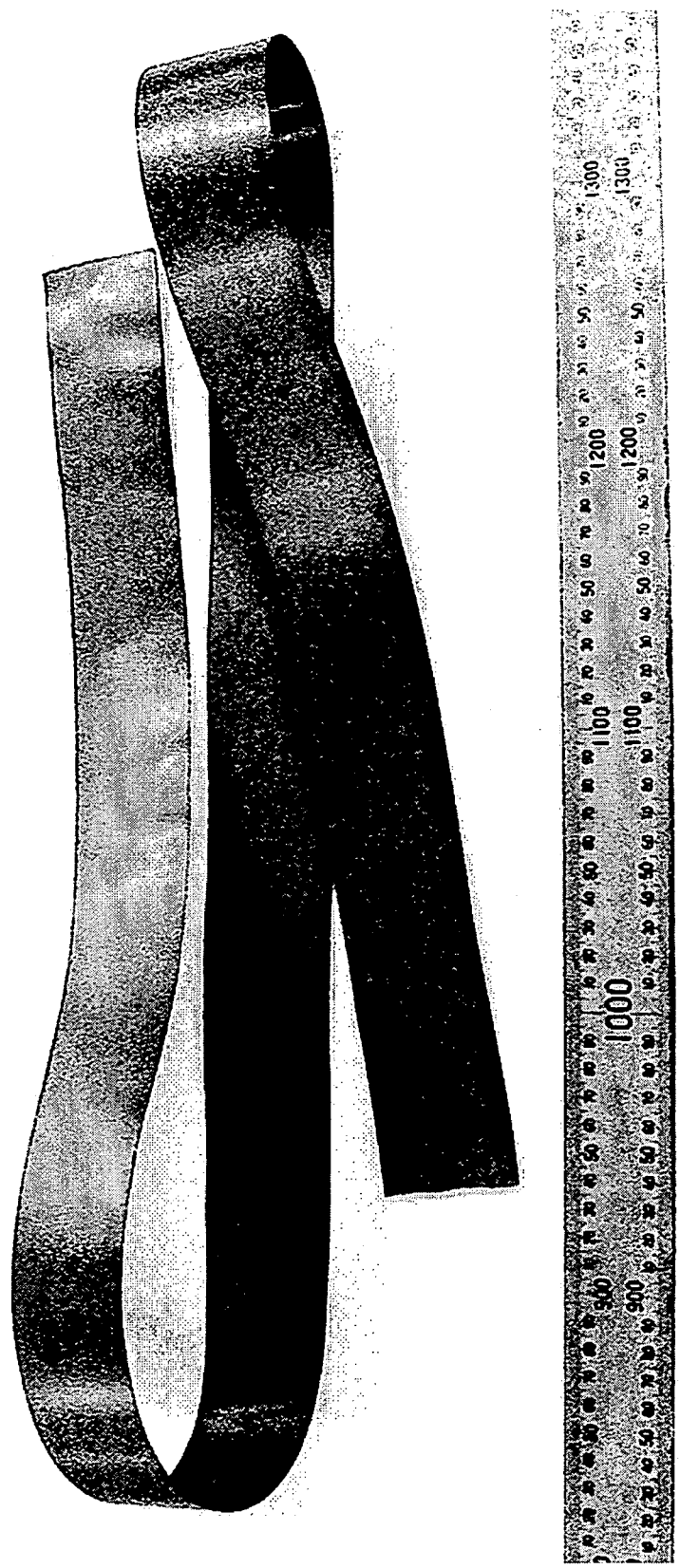
FIG. 3 is a photograph showing a general view of a nickel brazing sheet A according to an embodiment of the invention.

FIG. 3 is a photograph showing a general view of a nickel brazing sheet A produced by the powder roll compaction of the above described mixed powder equivalent to BNi-2 of JIS standard. The sheet was produced by the above described brazing sheet production device. Since the nickel brazing sheet A has flexibility as shown in the photograph, the sheet has excellent handling properties.

Figure 4:
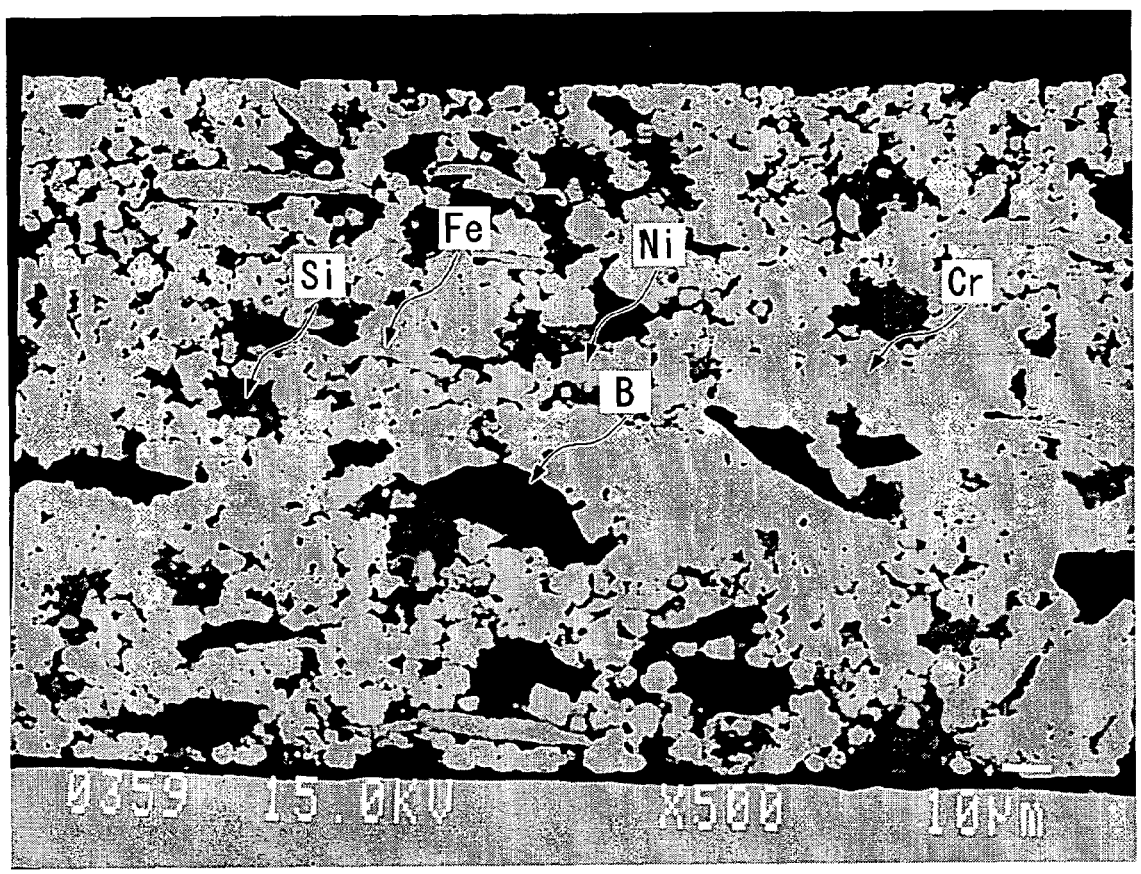
FIG. 4 is a photograph showing a cross section of a nickel brazing sheet A according to an embodiment of the invention.

FIGS. 4 and 5 are photographs showing a mixed state of powdered nickel (Ni), powdered chromium (Cr), powdered silicon (Si), powdered iron (Fe), and powdered boron (B), of the nickel brazing sheet A. FIG. 4 is a photograph showing a cross section of the nickel brazing sheet A. This photograph indicates a state in which the powdered nickel (Ni), powdered chromium (Cr), powdered silicon (Si), powdered iron (Fe), and powdered boron (B) are not alloyed but are mixed with each other as discrete grains.

FIG. 5 is a set of analytical images corresponding to the cross section in the above described FIG. 4 and shows the distribution of the respective constituent elements in the nickel brazing sheet A. In FIG. 5, the upper left image is a minified photograph of FIG. 4 for reference to the other analytical images. In the analytical images, regions containing each element of nickel (Ni), chromium (Cr), silicon (Si), iron (Fe), and boron (B) are shown by white regions. These regions correspond to the distribution of each of the particles shown in FIG. 4.

From FIGS. 4 and 5, it is easily understood that the powdered nickel (Ni), powdered chromium (Cr), powdered silicon (Si), powdered iron (Fe), and powdered boron (B) of the nickel brazing sheet A are not molten and alloyed, but are in a mixed state.

Figure 6:
FIG. 6 is a photograph showing a cross section of a brazing joint using a nickel brazing sheet A according to an embodiment of the invention.

FIGS. 6 and 7 are photographs showing a cross section of a brazing joint of inconels brazed using the nickel brazing sheet A in which grains of each base material are in a mixed state. FIG. 6 is a normal photograph of the cross section showing a state in which upper and lower inconel members are jointed with each other by the nickel brazing filler metal (that is, the nickel brazing sheet A made molten by heating) filling the interstitial space between the inconels.

FIG. 7 is a set of analytical images corresponding to the photograph of the cross section in FIG. 6 and shows the distribution of the respective constituent elements, nickel (Ni), chromium (Cr), silicon (Si), iron (Fe), and boron (B). In FIG. 7, the upper left image is a minified photograph of FIG. 6 for reference to the other analytical images.

By comparing the analytical images in FIG. 7 showing a state of the nickel brazing sheet A after brazing and the analytical images in FIG. 5 showing a state before brazing, it is obvious that each of the elements distributed as discrete grains before brazing are homogeneously mixed and alloyed by the heating during brazing.

The nickel brazing sheet A has a mixed state of discrete grains of the powdered nickel (Ni), powdered chromium (Cr), powdered silicon (Si), powdered iron (Fe), and powdered boron (B), which are not alloyed. This mixed state is realized by a firing temperature within the heating furnace 3.

Figure 8A:
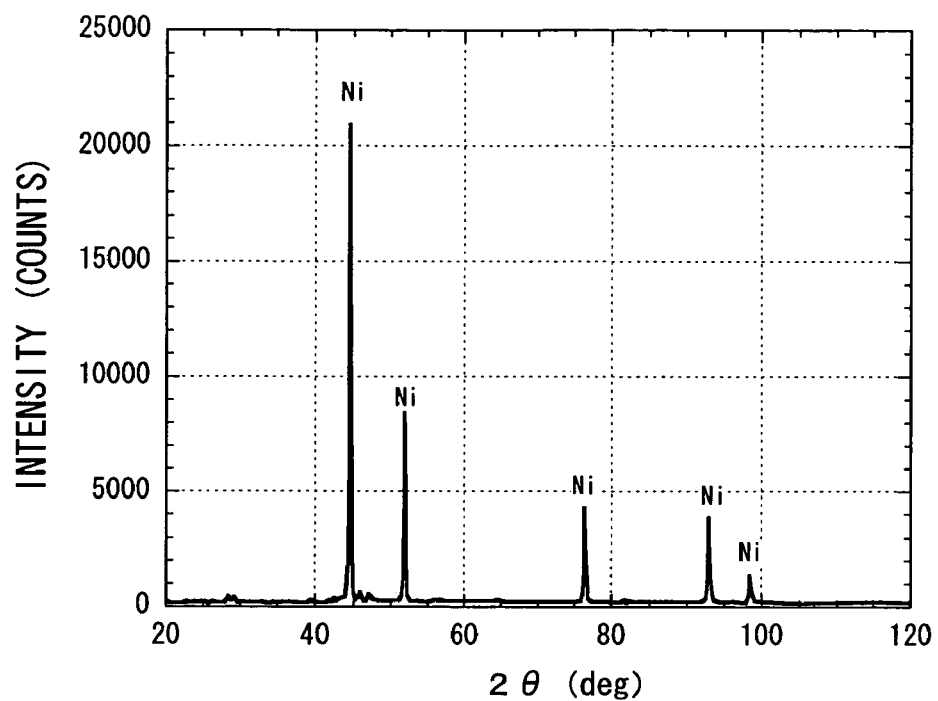
FIGS. 8A and 8B are X-ray diffraction patterns showing alloy states of a nickel brazing sheet A according to an embodiment of the invention.
Figure 8B:
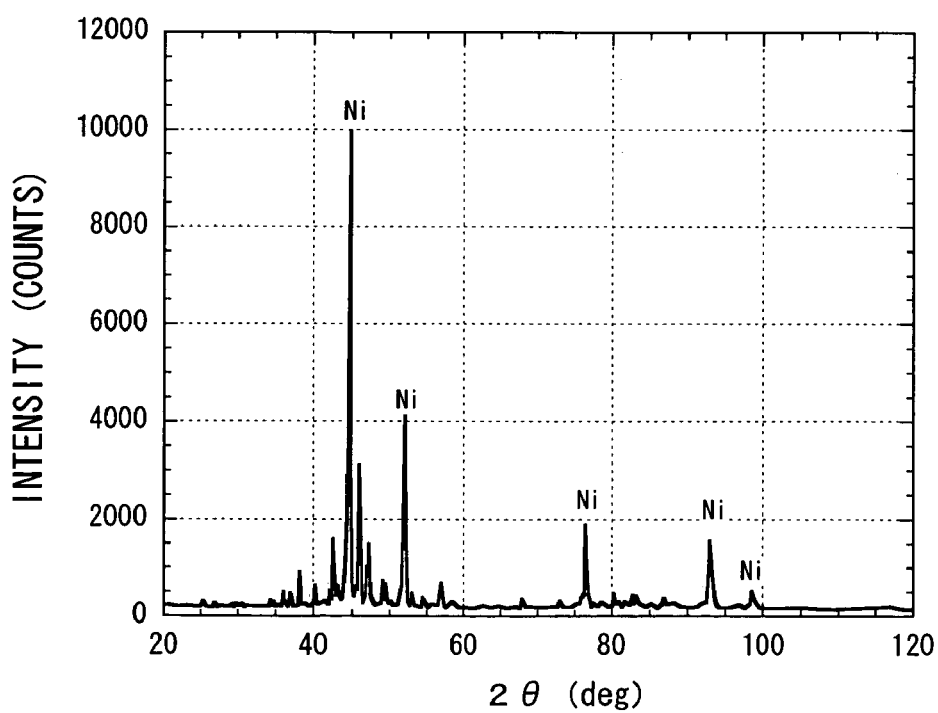

FIGS. 8A and 8B are X-ray diffraction patterns showing the dependency of alloying of the powdered nickel (Ni), powdered chromium (Cr), powdered silicon (Si), powdered iron (Fe), and powdered boron (B) on the firing temperature. FIG. 8A shows a state in which the setting of the sintering temperature is relatively low. While, FIG. 8B shows a state in which the setting of the sintering temperature is relatively high. In FIG. 8A of low firing temperature, the only obvious peak is that of nickel (Ni). In FIG. 8B of a relatively high firing temperature, by alloying nickel with the other elements, non-nickel (Ni) peaks become apparent.

Therefore, in order to avoid alloying and retain the mixed state of discrete grains of the powdered nickel (Ni), powdered chromium (Cr), powdered silicon (Si), powdered iron (Fe), and powdered boron (B), a sintering temperature in the heating furnace 3 must be controlled to a relatively low temperature.

(3) An equivalent material to BNi-2 of JIS standard may be formed by mixing powdered nickel (Ni), nickel-chromium (Ni—Cr) alloy powder, nickel-boron (Ni—B) alloy powder, iron-chromium (Fe—Cr) alloy powder, iron-nickel (Fe—Ni) alloy powder, and iron-silicon (Fe—Si) alloy powder. The mixture is made to totally comprise in base components nickel (Ni) and chromium (Cr) of not less than 6 wt % and not more than 8 wt %, boron (B) of not less than 2.75 wt % and not more than 3.5 wt %, iron (Fe) of not less than 2.5 wt % and not more than 3.5 wt %, and silicon (Si) of not less than 4 wt % and not more than 5 wt %. The mixed powder is formed into a green sheet by powder roll compaction and sintered within the heating furnace. Although the sintered sheet of the mixed powder does not have the brazing filler metal composition on a microscopic scale, it can be converted to a brazing filler metal by melting, and therefore can be used for brazing. Preferably, grain size of each powder is 100 μm or less.

(4) As an equivalent material to BNi-3 of JIS standard, it is possible to consider a mixture of powdered nickel (Ni), powdered silicon (Si), and powdered (B). The three types of powders are mixed, for example, in a proportion of 92.3 wt %:4.5 wt %:3.2 wt %, respectively.

(5) As an equivalent material to BNi-4 of JIS standard, a mixture of powdered nickel (Ni), powdered silicon (Si), and powdered boron (B) may be considered. The three types of powders are mixed, for example, in a proportion of 94.5 wt %:3.5 wt %:2.0 wt %, respectively.

(6) As an equivalent to BNi-5 of JIS standard, a mixture of powdered nickel (Ni), powdered chromium (Cr), and powdered silicon (Si) may be considered. The three types of powders are mixed, for example, in a proportion of 71 wt:19 wt %:10 wt %, respectively.

(7) As an equivalent material to BNi-6 of JIS standard, a mixture of powdered nickel (Ni) and powdered phosphorus (P) may be considered. The two types of powders are mixed, for example, in a proportion of 89 wt % to 11 wt %, respectively.

(8) As an equivalent material to BNi-7 of JIS standard, a mixture of powdered nickel (Ni), powdered chromium (Cr), and powdered phosphorus (P) may be considered. The three types of powders are mixed, for example, in a proportion of 77 wt %:13 wt %:10 wt %, respectively.

The powder of the brazing filler metal composition as a raw material is not limited to the above described powders of a nickel brazing filler metal composition. For example, brazing sheets may be made of an aluminum brazing filler metal, silver brazing filler metal or the like. For obtaining such a sheet, at least two or more different types of powders are mixed with each other in a predetermined proportion of weight. The mixed metal is formed into a sheet shape by powder roll compaction, and thereby a brazing sheet is obtained. The mixed powder as a mixture of hetero types of powders is obtained by mixing an alloy powder or pure metal powder with different types of pure metal powder or different types of alloy powder.

Aluminum Brazing Sheet

For producing an aluminum brazing sheet composed mainly of aluminum (Al), an use of a powder of a brazing filler metal composition equivalent to BA4047 of JIS standard may be considered. For example, this powder may be a mixture of two types of powders, powdered aluminum (Al) and powdered silicon (Si), which are mixed, for example, in a proportion of 88 wt % to 12 wt %, respectively. In this case, an allowable range of fluctuation range for each component is ±5%.

In addition, a flux powder containing fluoride (for example, cesium fluoride) may be added to the mixed powder.

Copper Brazing Sheet

A brazing sheet mainly comprising copper (Cu) may be produced by using the following powders of a brazing filler metal composition. In this case, different from the above described case for producing a nickel brazing sheet A, a sintering temperature in the heating furnace 3 is controlled to a relatively high temperature, for example, corresponding to about 85% of the liquidus temperature of the powder of the brazing filler metal composition. At this setting, a copper brazing sheet having substantial strength and flexibility can be produced. In each component in the following description, an allowable range of fluctuation is ±5%.

(1) As an equivalent material to BCuP-1 of JIS standard, a mixture of powdered copper (Cu) and powdered phosphorus (P) may be used. For example, the two types of powders are mixed in a proportion of 95 wt % to 5.0 wt %, respectively.

(2) As an equivalent material to BCuP-2 of JIS standard, a mixture of powdered copper (Cu) and powdered phosphorus (P) powder may be used. For example, the two types of powders are mixed in a proportion of 93 wt % to 7.0 wt %, respectively. Alternatively, the brazing filler metal composition of BCuP-2 may also be realized by using a mixture of 50 wt % of powdered copper (Cu) and 50 wt % of powdered $CuP_3$, that is an alloy of copper (Cu) and phosphorus (P).

(3) As an equivalent material to BCuP-3 of JIS standard, a mixture of powdered copper (Cu), powdered phosphorus (P), and powdered silver (Ag) may be used. For example, the three types of powders are mixed in a proportion of 88.7 wt %:6.3 wt %:5.0 wt %, respectively.

(4) As an equivalent material to BCuP-4 of JIS standard, a mixture of powdered copper (Cu), powdered phosphorus (P), and powdered silver (Ag) may be used. For example, the three types of powders are mixed in a proportion of 87 wt %:7.0 wt %:6.0 wt % respectively. A brazing sheet formed by forming such a mixed powder into sheet shape by powder roll compaction is a sheet of mixed materials that do not alloy and have the composition of the powders. After melting, the sheet is converted to phosphorus-copper brazing filler metal BCuP-4 of JIS standard.

(5) As an equivalent material to BCuP-5 of JIS standard, a mixture of powdered copper (Cu), powdered phosphorus (P), and powdered silver (Ag) may be used. For example, the three types of powders are mixed in a proportion of 79.8 wt %:5.0 wt %:15.2 wt %, respectively.

(6) As an equivalent material to BCuP-6 of JIS standard, a mixture of powdered copper (Cu), powdered phosphorus (P), and powdered silver (Ag) may be used. For example, the three types of powders are mixed in a proportion of 91 wt %:7.0 wt %:2.0 wt %, respectively.

Silver Brazing Sheet

A brazing sheet mainly composed of silver (Ag) may be produced by using the following powders of a brazing filler metal composition. In each component in the following description, an allowable range of fluctuation is ±5%.

(1) As an equivalent material to BAg-1 of JIS standard, a mixture of powdered silver (Ag), powdered copper (Cu), powdered zinc (Zn), and powdered cadmium (Cd) may be considered. For example, the four types of powders are mixed in a proportion of 48 wt %:16 wt %:16 wt %:20 wt %, respectively.

(2) As an equivalent material to BAg-2 of JIS standard, a mixture of powdered silver (Ag), powdered copper (Cu), powdered zinc (Zn), and powdered cadmium (Cd) are considered. For example, the four types of powders are mixed in a proportion of 36 wt %:26 wt %:20 wt %:18 wt %, respectively.

(3) As an equivalent material to BAg-3 of JIS standard powdered silver (Ag), powdered copper (Cu), powdered zinc (Zn), powdered cadmium (Cd), and powdered nickel (Ni) may be considered. For example, the five types of powders are mixed in a proportion of 50 wt %:15.5 wt %:15.5 wt %:16 wt %:3 wt %, respectively.

(4) As an equivalent material to BAg-4 of JIS standard, a mixture of powdered silver (Ag), powdered copper (Cu), powdered zinc (Zn), and powdered nickel (Ni) may be considered. For example, the four types of powders are mixed in a proportion of 40 wt %:30 wt %:28 wt %:2.0 wt %, respectively.

(5) As an equivalent material to BAg-5 of JIS standard, a mixture of powdered silver (Ag), powdered copper (Cu), and powdered zinc (Zn) may be considered. For example, the three types of powders are mixed in a proportion of 45 wt %:30 wt %:25 wt %, respectively.

(6) As an equivalent material to BAg-6 of JIS standard a mixture of powdered silver (Ag), powdered copper (Cu), and powdered zinc (Zn) may be considered. For example, the three types of powders are mixed in a proportion of 50 wt %:34 wt %:16 wt %, respectively.

(7) As an equivalent to BAg-7 of JIS standard, a mixture of powdered silver (Ag), powdered copper (Cu), powdered zinc (Zn), and powdered tin (Sn) may be considered. For example, the four types of powders are mixed, for example, in a proportion of 56 wt %:22 wt %:17 wt %:5.0 wt %, respectively.

(8) As an equivalent to BAg-8 of JIS standard, a mixture of powdered silver (Ag) and powdered copper (Cu) powder may be considered. For example, the two types of powders are mixed in a proportion of 72 wt % to 28 wt %, respectively.

The invention claimed is:

1. A brazing sheet having a brazing filler metal composition and a structure of a sintered powder of at least two or more types of powders, the two or more types of powders discretely mixed substantially throughout a cross section of the brazing sheet, wherein the brazing sheet is produced by mixing the powders in a predetermined proportion of weight to have the brazing filler metal composition, forming the mixed powders into a sheet shape by powder roll compaction, and sintering the mixed powders being in the sheet shape.

2. The brazing sheet according to claim 1,
wherein the powder of the brazing filler metal composition is mainly composed of nickel.

3. The brazing sheet according to claim 1,
wherein the powder of the brazing filler metal composition is mainly composed of aluminum.

4. The brazing sheet according to claim 3, comprising 10 to 15 wt % of silicon.

5. The brazing sheet according to claim 1,
wherein the powder of the brazing filler metal composition is mainly composed of copper.

6. A brazing sheet which is produced by forming a powder of a brazing filler metal composition into a sheet shape by powder roll compaction, wherein the powder of the brazing filler metal composition is not completely alloyed and in a mixed state in the brazing sheet, and the brazing sheet is composed of the brazing filler metal composition, wherein the powder of the brazing filler metal composition comprises a mixture of at least two or more types of powders which are mixed in a predetermined proportion of weight to have a composition of a brazing filler metal, the powder of the brazing filler metal composition is mainly composed of copper, and comprising 4 to 8 wt % of phosphorus.

7. A method of producing a brazing sheet, comprising:
rolling a powder of a brazing filler metal composition by powder roll compaction; and thereby forming the powder into a sheet shape, wherein the powder of the brazing filler metal composition is a mixture of at least two or more types of powders which are mixed in a predetermined proportion of weight to have a composition of a brazing filler metal, the powder of the brazing filler metal composition is mainly composed of copper, and 4 to 8 wt % of phosphorus is contained in the brazing sheet.

8. A method of producing a brazing sheet, comprising:
rolling a powder of a brazing filler metal composition by powder roll compaction; and thereby forming the powder into a sheet shape, and
sintering of the powder being in the sheet shape, wherein the powder of the brazing filler metal composition is a mixture of at least two or more types of powders which are mixed in a predetermined proportion of weight to have a composition of a brazing filler metal, and the powder of the brazing filler metal composition is not completely alloyed and is in a mixed state.

9. A method of producing a brazing sheet according to claim 8, wherein the powder roll compaction is performed by: feeding the powder of brazing filler metal composition into a space formed by a pair of rolling rollers; and sequentially delivering the powder formed in the sheet shape.

10. A brazing sheet according to claim 1, wherein the grains of the brazing filler metal are discretely mixed substantially throughout a cross section of the brazing sheet.

11. The method of producing a brazing sheet according to claim 8,
wherein the powder of the brazing filler metal composition is a mixture of at least two or more types of powders which are mixed in a predetermined proportion of weight to have a composition of a brazing filler metal.

12. The method of producing a brazing sheet according to claim 11,
wherein the powder of the brazing filler metal composition is not completely alloyed and is in a mixed state.

13. The method of producing a brazing sheet according to claim 12,
wherein the powder of the brazing filler metal composition is mainly composed of nickel.

14. The method of producing a brazing sheet according to claim 12,
wherein the powder of the brazing filler metal composition is mainly composed of aluminum.

15. The method of producing a brazing sheet according to claim 14,
wherein 10 to 15 wt % of silicon is contained in the brazing sheet.

16. The method of producing a brazing sheet according to claim 12,
wherein the powder of the brazing filler metal composition is mainly composed of copper.

17. A method of producing a brazing sheet according to claim 8, wherein sintering of the powder being in sheet shape is performed at a temperature corresponding to between about 50% and about 85% of a liquidus temperature of the brazing filler metal composition.

* * * * *